US011874436B2

(12) United States Patent
Tazawa et al.

(10) Patent No.: US 11,874,436 B2
(45) Date of Patent: Jan. 16, 2024

(54) OPTICAL DEVICE HAVING FLUID-FILLED PARTITIONED SPACES WITH ELECTRIC FIELD CONTROL MATERIAL

(71) Applicant: Dexerials Corporation, Tokyo (JP)

(72) Inventors: Hiroshi Tazawa, Tagajo (JP); Kazuhiko Noda, Tagajo (JP); Kyoko Sakurai, Tagajo (JP); Shunichi Kajiya, Tagajo (JP)

(73) Assignee: Dexerials Corporation, Tokyo (JP)

( * ) Notice: Subject to any disclaimer, the term of this patent is extended or adjusted under 35 U.S.C. 154(b) by 413 days.

(21) Appl. No.: 16/892,284

(22) Filed: Jun. 4, 2020

(65) Prior Publication Data
US 2020/0393598 A1 Dec. 17, 2020

(30) Foreign Application Priority Data

Jun. 11, 2019 (JP) ................................ 2019-108544

(51) Int. Cl.
| | | |
|---|---|---|
| *B29C 33/42* | (2006.01) | |
| *G02B 1/11* | (2015.01) | |
| *G02B 5/02* | (2006.01) | |
| *G02F 1/167* | (2019.01) | |
| *G02F 1/1676* | (2019.01) | |
| *G09G 3/34* | (2006.01) | |
| *G02B 1/04* | (2006.01) | |
| *G02B 1/18* | (2015.01) | |

(52) U.S. Cl.
CPC .............. *G02B 1/11* (2013.01); *B29C 33/424* (2013.01); *G02B 1/04* (2013.01); *G02F 1/167* (2013.01);
(Continued)

(58) Field of Classification Search
CPC ....... G02F 1/167; G02F 1/1676–16766; G02F 1/1677; G09G 3/344; G09G 3/3446;
(Continued)

(56) References Cited

U.S. PATENT DOCUMENTS

| 7,751,115 B2 * | 7/2010 | Song ..................... G09G 3/344 345/107 |
| 2007/0046623 A1 * | 3/2007 | Song ..................... G09G 3/344 345/107 |

(Continued)

FOREIGN PATENT DOCUMENTS

| JP | 2012123086 A | 6/2012 |
| JP | 2012203342 A | 10/2012 |

(Continued)

OTHER PUBLICATIONS

Dec. 20, 2022, Notification of Reasons for Refusal issued by the Japan Patent Office in the corresponding Japanese Patent Application No. 2019-108544.
(Continued)

*Primary Examiner* — Ryan S Dunning
(74) *Attorney, Agent, or Firm* — KENJA IP LAW PC (57) ABSTRACT

The optical device 1 according to the present disclosure includes substrates 10 provided opposite to each other, a partition wall 20 formed between opposing faces of the substrates 10 and separating adjacent spaces, and a fluid 30 filled in each space 20b separated by the partition wall and containing an electric field control material, wherein the optical device further includes, between at least one of the substrates 10 and the partition wall 20, a fine uneven layer 40 having fine uneven shapes and a conductive layer 50 formed according to a shape of the fine uneven layer.

4 Claims, 4 Drawing Sheets

(52) U.S. Cl.
CPC ........... *G02F 1/1676* (2019.01); *G09G 3/344* (2013.01); *G09G 3/3446* (2013.01); *G02B 1/18* (2015.01); *G02B 5/0294* (2013.01); *G09G 2300/0421* (2013.01); *G09G 2300/0426* (2013.01)

(58) Field of Classification Search
CPC ... G09G 2300/0421; G09G 2300/0426; G09G 2320/0233
See application file for complete search history.

(56) References Cited

U.S. PATENT DOCUMENTS

2008/0129933 A1*  6/2008  Nishida ................. G02B 1/118
                                                                349/137
2019/0107765 A1*  4/2019  Whitehead ............. G02F 1/315

FOREIGN PATENT DOCUMENTS

| JP | 2015054402 A | 3/2015 | | |
|---|---|---|---|---|
| JP | 2015114448 A | 6/2015 | | |
| KR | 1020150055927 A | 5/2015 | | |
| WO | WO-2020010167 A1 * | 1/2020 | ........... | G02B 6/0051 |

OTHER PUBLICATIONS

May 16, 2023, Official Decision of Refusal issued by the Japan Patent Office in the corresponding Japanese Patent Application No. 2019-108544.

* cited by examiner

OPTICAL DEVICE HAVING FLUID-FILLED PARTITIONED SPACES WITH ELECTRIC FIELD CONTROL MATERIAL

TECHNICAL FIELD

The present disclosure relates to an optical device that can improve the adhesion property between a substrate and a partition wall and is excellent in optical performance, a method of manufacturing the optical device and an electronic device having an optical device that is excellent in durability and optical performance.

BACKGROUND

In recent years, in the technical field of viewing angle control devices for microcapsule type electronic papers, displays or the like, an optical device is used. In the optical device, a fluid containing an electric field control material such as particles is encapsulated between two opposing substrates, and in this state an electric field is applied between the substrates to control the movement of the particles, thus an image is displayed.

In the optical device as described above, due to settling or uneven distribution of the electric field control material, poor display, in particular uneven display may occur. Therefore, in order to prevent such image defect, a technique is employed, in which a partition wall is formed between opposing substrates to divide a migration space, that is, a moving space, of the electric field control material into minute spaces. Ink or gas (fluid) containing an electric field control material is encapsulated in each space divided by the partition wall.

However, in the technique of forming a partition wall between opposing substrates, peeling is likely to occur between the partition wall and each substrate, which causes a problem of durability.

For example, when a film of indium tin oxide (ITO) is used as a base material of a substrate and a partition wall is formed thereon by a UV imprinting process, a resin used for the UV imprinting process and the ITO film may not adhere to each other well. One of the reasons may be, because the resin used for the UV imprinting is solvent-free, and releasability from a mold is needed to be secured, a large amount of adhesive component cannot be blended. Furthermore, in the case of a roll-to-roll process, due to process constrains such as a short penetration time between the substrate and the resin compared to the single-wafer process, adhesion may be different even if the same resin is used.

CITATION LIST

Patent Literature

PLT 1: JP2015-054402 (A)

SUMMARY

Technical Problem

Thus, for the purpose of enhancing the adhesion property between the partition wall and the substrate, for example, Patent Literature (PTL) 1 discloses a technique of forming a partition wall, on the ITO substrate, by photolithography by using an adhesive resin that requires a thermal process.

However, with the technique disclosed in PTL 1, although adhesion can be ensured between the ITO substrate and the partition wall, it takes time to form the partition wall, which may cause deterioration of manufacturing efficiency.

In addition, when the technique disclosed in PTL 1 is used, an adhesive resin is provided between the ITO substrate and the partition wall, and reflection may occur at an interface therebetween, which may cause a decrease in the optical performance of the device.

The present disclosure has been conceived in view of the above described problems, and is to provide an optical device that can improve the adhesion property between a substrate and a partition wall without causing a decrease in manufacturing efficiency and is excellent in optical performance, and a method of manufacturing the optical device. The present disclosure is to provide also an electronic device having an optical device that is excellent in durability and optical performance.

Solution to Problem

In order to solve the above described problems, the inventors have conducted extensive research of an optical device including substrates provided opposite to each other, a partition wall formed between the opposing faces of the substrates and separating adjacent spaces, and a fluid filled in the spaces separated by the partition wall and containing an electric field control material, and found that, when a fine uneven layer having fine uneven shapes is formed together with a conductive layer between the substrate and the partition wall, the fine uneven layer acts an anti-reflection structure, and the optical performance can be improved. Furthermore, the inventors have found that an anchor effect can be obtained by the fine uneven shapes, and thus the adhesion property between the substrate and the partition wall can be also improved. In addition, since the fine uneven layer can also be formed by imprint and the like, as compared with the case where a pattern is formed by using a technique such as photolithography, the burden on the manufacturing cost and the manufacturing time is not increased.

The present disclosure is made on the basis of the above described findings, and the gist thereof is as follows:

(1) An optical device including substrates provided opposite to each other, a partition wall formed between opposing faces of the substrates and separating adjacent spaces, and a fluid filled in the spaces separated by the partition wall and containing an electric field control material, wherein the optical device further includes, between at least one of the substrates and the partition wall, a fine uneven layer having fine uneven shapes and a conductive layer formed according to a shape of the fine uneven layer.

(2) The optical device according to (1), wherein an average distance between unevennesses of the fine uneven layer is 50 to 300 nm.

(3) The optical device according to (1) or (2), wherein an average height of unevenness of the fine uneven layer is 30 nm or more.

(4) The optical device according to any one of (1) to (3), wherein the uneven shapes of the fine uneven layer are formed by imprint.

(5) The optical device according to any one of (1) to (4), wherein the fine uneven layer and the conductive layer are formed between both of the substrates and the partition wall.

(6) A method of manufacturing an optical device, including the steps of:

forming a fine uneven layer on each of opposing faces of two opposing substrates;

forming a conductive layer to cover the fine uneven layer;

forming, by imprint, a partition wall structure configured to separate adjacent spaces, on the conductive layer; and filling a fluid containing an electric field control material into spaces separated by the partition wall.

(7) An electronic device having an optical device according to any one of (1) to (5).

Advantageous Effect

According to the present disclosure, an optical device that can improve the adhesion property between a substrate and a partition wall without causing a decrease in manufacturing efficiency and is excellent in optical performance and a method of manufacturing the optical device can be provided. Further, according to the present disclosure, an electronic device having an optical device that is excellent in durability and optical performance can be provided.

DETAILED DESCRIPTION

Hereinafter an embodiment of the present disclosure will be illustrated specifically with reference to drawings as necessary.

Figure 1:
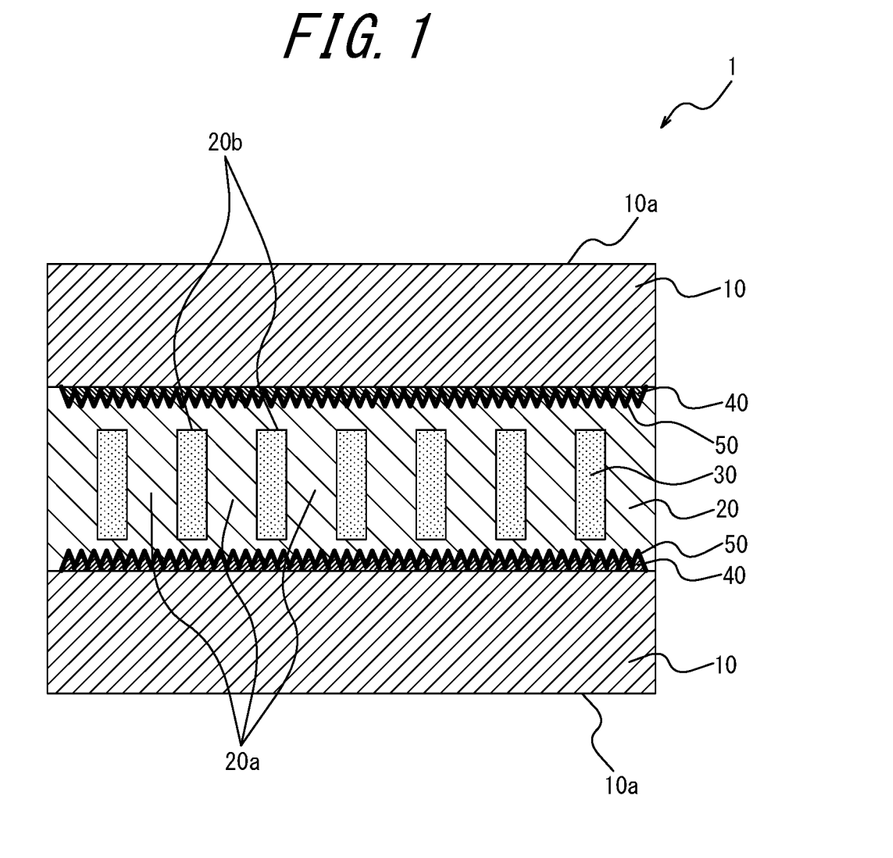
FIG. 1 is a cross-sectional view schematically illustrating an embodiment of an optical device according to the present disclosure.
Figure 2:
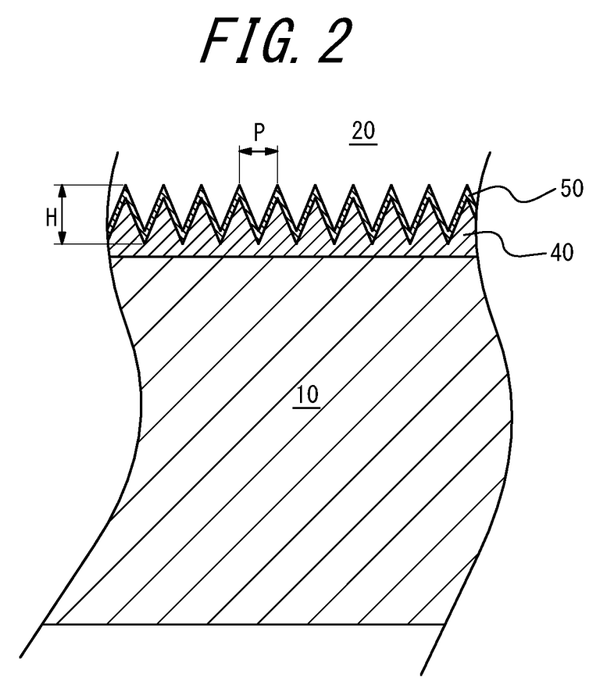
FIG. 2 is a cross-sectional view of an embodiment of the optical device according to the present disclosure, in which an interface between the substrate and the partition wall is enlarged and schematically illustrated.
Figure 3:
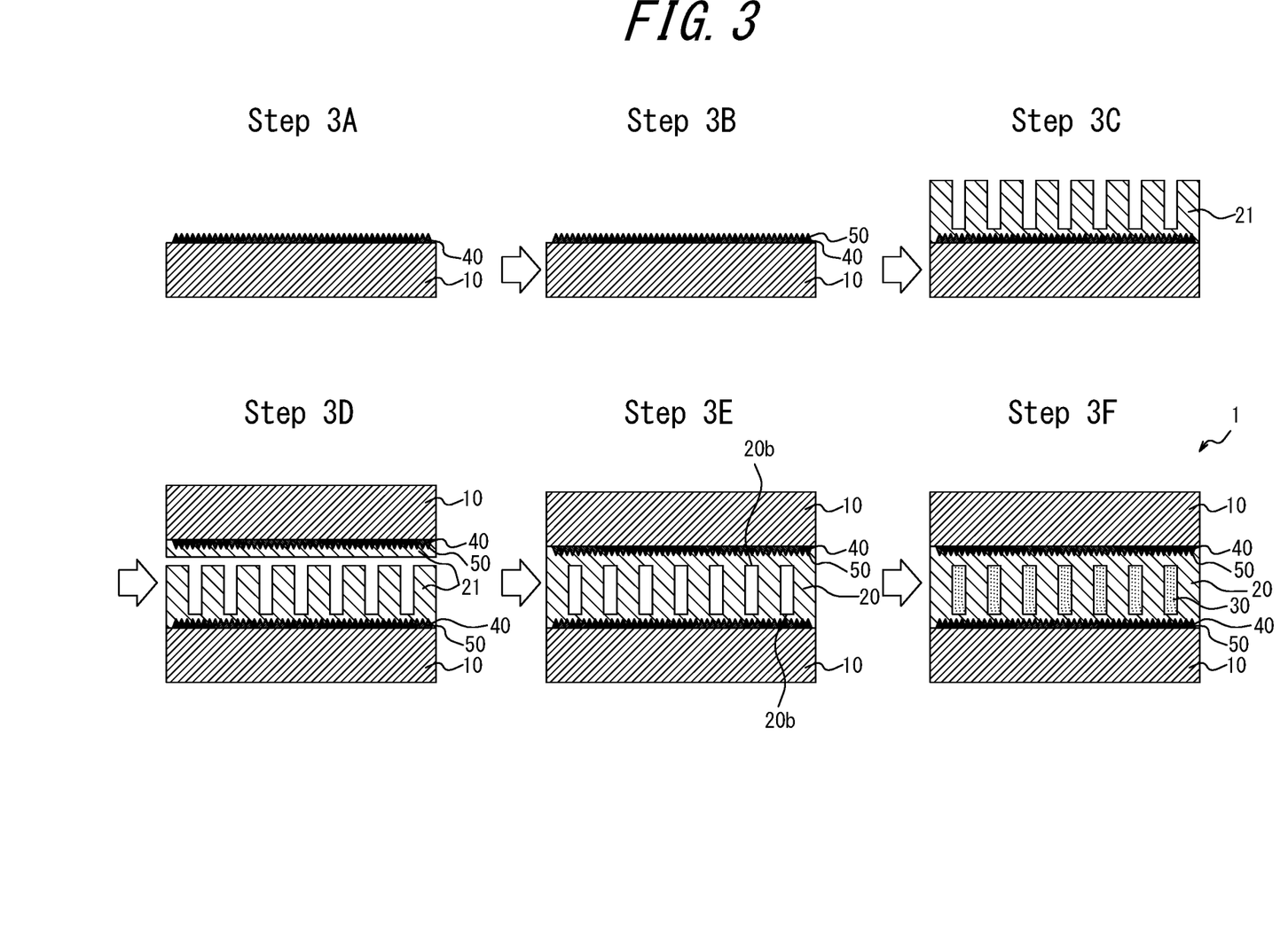
FIG. 3 is a flow diagram illustrating an example of a manufacturing process of an embodiment of a method of manufacturing the optical device according to the present disclosure.

FIG. 1 is a cross-sectional view schematically illustrating an embodiment of an optical device according to the present disclosure, FIG. 2 is a cross-sectional view of an embodiment of the optical device according to the present disclosure, in which an interface between a substrate and a partition wall is enlarged and schematically illustrated, and FIG. 3 illustrates an example of a flow of a manufacturing process of an embodiment of a method of manufacturing the optical device according to the present disclosure.

It is to be noted that each member disclosed in FIGS. 1 to 3 is represented by a scale or a shape different from the actual ones for convenience of explanation.

<Optical Device>

First, an embodiment of the optical device according to the present disclosure will be described.

As illustrated in FIG. 1, an optical device 1 according to an embodiment of the present disclosure includes substrates 10 provided opposite to each other, a partition wall 20 formed between opposing faces of the substrates 10 and separating adjacent spaces, and a fluid 30 filled in the spaces separated by the partition wall and containing an electric field control material.

As illustrated in FIG. 1, the optical device 1 according to an embodiment of the present disclosure further includes, between at least one of the substrates 10 (both substrates 10 in FIG. 1) and the partition wall 20, a fine uneven layer 40 having fine uneven shapes and a conductive layer 50 formed according to a shape of the fine uneven layer 40.

The fine uneven shape of the fine uneven layer 40 acts as an anti-reflection structure, which enables the optical performance of the optical device 1 to be enhanced. In addition, an anchor effect can be obtained by the above described uneven shape, which also enables adhesion property between the substrate 10 and the partition wall 20 to be improved. Moreover, it is not necessary for the fine uneven layer 40 to be formed by a complicated process such as photolithography and the like, and the fine uneven layer 40 can be formed by an efficient process such as imprint. Thus a decrease in efficiency of the optical device 1 does not occur.

The type of the optical device 1 according to the present disclosure is not particularly limited as long as it has the above described configuration. For example, an embodiment of the optical device according to the present disclosure can be used as viewing angle control devices for electronic papers, personal computers, mobile terminals such as smart phones, tablets and the like and displays mounted on vehicles.

Next, each member constituting the optical device 1 according to an embodiment of the present disclosure will be described.

(Substrate)

As illustrated in FIG. 1, the optical device 1 according to an embodiment of the present disclosure includes the substrates 10 provided opposite to each other.

Here, each substrate 10 is a transparent substrate, and has an electrode (not illustrated) on a surface 10a on the other side of the opposing face.

It is to be noted that, the "transparent" means herein that the transmittance of the light of the wavelength belonging to the visible light band (approximately from 360 nm to 830 nm) is high, and that the transmittance of the light is 70% or more.

The material constituting the substrate 10 is not particularly limited, and can be appropriately selected according to the type and the required performance of the optical device 1.

As a material of the substrate 10, for example, a transparent film such as polyethylene (PE), polyethylene terephthalate (PET), polyethersulfone (PES), polyethylene naphthalate (PEN), polypropylene (PP), polycarbonate (PC), cycloolefin polymer, cycloolefin copolymer, polyimide, vinyl chloride, and the like, or a resin plate such as a transparent glass may be used.

Furthermore, as for the surface of the substrate 10, an organic layer such as a hard coat, an anti-glare coat, or an easy-to-adhere coat, or a metal film or a metal compound film such as a barrier layer, a dielectric layer, or a refractive index adjusting layer can be formed on the surface of the substrate 10 as necessary.

The thickness of the substrate 10 is not particularly limited, and may be appropriately selected according to the type and the required performance of the optical device 1. Further, the thickness of the two substrates 10 may be the same or different.

Here, from the viewpoint of achieving thinning while ensuring strength, the thickness of the substrate 10 is preferably from 25 to 200 μm, and more preferably from 50 to 150 μm.

(Partition Wall)

As illustrated in FIG. 1, the optical device 1 according to an embodiment of the present disclosure further includes the partition wall 20 formed between the opposing faces of the substrates 10 and separating adjacent spaces.

Here, about the wording of the partition wall 20 "separating adjacent spaces" means that a space existing between the opposing faces of the substrates 10 is separated by the partition wall. For example, in FIG. 1, each portion 20a of the partition wall 20 extending in the direction connecting the two substrates 10 separates adjacent spaces, and forms each space 20b (also referred to as a "cell") configured to be filled with a fluid 30, which will be described later.

Here, the material constituting the partition wall 20 is not particularly limited, and can be appropriately selected according to the type and the required performance of the optical device 1. For example, an ultraviolet curing resin, a thermosetting resin, a thermoplastic resin, or a resin obtained by combining these materials can be used as the material of the partition wall 20.

The method of forming the partition wall 20 is also not particularly limited, and can be appropriately selected according to the required performance. Examples include imprinting process, photolithography, injection molding and the like. Among them, from the viewpoint of efficiency of the manufacturing process, it is preferable to use the imprint process.

The shape (pattern) of the space 20b separated by the partition wall is also not particularly limited, and can be appropriately selected according to the type and the required performance of the optical device 1.

(Fluid)

Further, as illustrated in FIG. 1, the optical device 1 according to an embodiment of the present disclosure further includes a fluid 30 filled in each space 20b separated by the partition wall 20.

Here, the fluid 30 contains an electric field control material (not illustrated), and an image can be displayed when the electric field control material is moved by applying an electric field between the substrates 10.

The fluid 30 includes at least the electric field control material and a dispersion medium for dispersing the electric field control material. In addition, the fluid 30 can contain other components, as appropriate, according to the optical device and the performance required for the fluid 30.

The electric field control material is a material that responds to an electric field, and the type, the shape, and the like thereof are not particularly limited, and known electric field controls can be appropriately used according to the type of the optical device and the performance required for the fluid 30. Examples of the electric field control material include a charge particle material and a liquid crystal material, and examples of the charge particle material include a so-called electrophoretic material in which white and black particles or colored particles move in response to an electric field, a material represented by a twist ball in which particles are rotated by an electric field colored into two colors, or a nanoparticle material moved by an electric field, and the like. On the other hand, examples of the liquid crystal material include a material known as Polymer Dispersed Liquid Crystal (PDLC) that electrically controls transmission and scattering, a material in which a dye is mixed with liquid crystal, a cholesteric liquid crystal material, and the like. The electric field control material can be appropriately selected in accordance with a desired function and a use.

The type of the dispersion medium is not particularly limited, and a gas or a liquid can be appropriately selected according to the type of the optical device or the electric field control material.

(Fine Uneven Layer, Conductive Layer)

Further, as illustrated in FIGS. 1 and 2, the optical device 1 according to the present disclosure includes, between at least one of the substrates 10 and the partition wall 20, a fine uneven layer 40 having fine uneven shapes and a conductive layer 50 formed according to the shape of the fine uneven layer 40.

Since the fine uneven layer 40 and the conductive layer 50 each has fine uneven shapes, these layers can act as an anti-reflection structure. As a result thereof, the optical performance of the optical device 1 can be enhanced. Furthermore, an anchor effect can be obtained by the fine uneven shape of the fine uneven layer 40 and the conductive layer 50. Thus, adhesion property between the substrate 10 and the partition wall 20 can also be improved. In addition, since it is not necessary for the fine uneven layer 40 to be formed by a complicated process such as photolithography and the like, and the fine uneven layer 40 can be formed by an efficient process such as imprint, manufacturing efficiency of the optical device 1 is not decreased.

Here, as described above, the fine uneven layer 40 is a layer serving as an adhesive layer and a refractive index adjusting layer in the optical device 1 according to the present disclosure.

Although the material constituting the fine uneven layer 40 is not particularly limited, it is preferable, from the viewpoint of further enhancing the light transmittance and the adhesion, to contain an acrylic resin such as an acrylic monomer or an acrylic oligomer, or an epoxy resin, used for an optical component application.

Further, as illustrated in FIG. 2, an average distance between unevennesses P of the fine uneven layer 40 is preferably from 50 to 300 nm. When the distance between unevennesses is 300 nm or less, it is equal to or less than the wavelength of the visible light. Therefore the reflection suppression effect is increased, and more excellent optical characteristics can be obtained. On the other hand, when the average distance between unevennesses is 50 nm or more, a higher anchor effect can be obtained, and as a result, adhesion property between the substrate 10 and the partition wall 20 can be further enhanced, and in addition, imprint molding is easily performed. From the same viewpoint, the average distance between unevennesseses P of the fine uneven layer 40 is more preferably from 70 to 280 nm, and particularly preferably from 80 to 250 nm.

Here, the average distance between unevennesseses P of the fine uneven layer 40 is an arithmetic mean value of the distance between adjacent peaks and adjacent valleys. The average distance between unevennesseses P of the fine uneven layer 40 can be observed, for example, using a scanning electron microscope (SEM) or a cross-section transmission electron microscope (cross-section TEM) and the like. The method of deriving the arithmetic mean value of the distance between adjacent peaks and adjacent valleys may, for example, be a method in which a plurality of combinations of adjacent peaks and/or a plurality of combinations of adjacent valleys are selected, the distances between the peaks and the distances between the valleys constituting these combinations are measured, and the measured values are averaged.

Furthermore, as illustrated in FIG. 2, the average height of unevenness H of the fine uneven layer 40 is preferably 30 nm or more. When the average height of unevenness of the fine uneven layer 40 is 30 nm or more, a higher anchor effect can be obtained, and adhesion property between the substrate 10 and the partition wall 20 can be further enhanced. From the same viewpoint, the average height of unevenness H is preferably 40 nm or more, and more preferably 50 nm or more.

The average height of unevenness H of the fine uneven layer 40 can be observed by using a scanning electron microscope (SEM) or a cross-section transmission electron microscope (cross-section TEM) and the like, for example. The method of deriving the arithmetic mean value of the height of unevenness H of the fine uneven layer 40 may, for example, be a method in which a plurality of heights of unevenness H are measured, and the measured values are averaged.

The method of forming the fine uneven layer 40 is not particularly limited, and a known film forming method can be appropriately used. However, from the viewpoint of enhancing the manufacturing efficiency, imprint is preferable.

The conditions of forming the fine uneven layer 40 by imprint are not particularly limited, and a known imprinting apparatus may be used. For example, when an ultraviolet curing resin is used as a material of the fine uneven layer 40, the fine uneven layer 40 can be formed by: using a cylindrical mold having a film unwinding and winding mechanism and a nip roll that is brought into contact with the mold and the pressure of which is adjustable; performing ultraviolet curing while pressing the ultraviolet curing resin against the cylindrical mold; and after that winding a film.

The conductive layer 50 is a layer provided to impart a function as an electrode to the substrate 10, and is formed according to the uneven shape of the fine uneven layer 40.

The material of the conductive layer 50 is not particularly limited as long as it has conductivity and can be used as an electrode. Examples of the material of the conductive layer 50 include indium tin oxide (ITO), zinc oxide (ZnO), tin oxide (SnO), and the like.

The conductive layer 50 can be formed by sputtering, vacuum evaporation, chemical vapor deposition, or the like.

Although the fine uneven layer 40 and the conductive layer 50 may be formed between at least one of the substrates 10 and the partition wall 20, in order to improve the adhesion and light transmission characteristics, they are preferably formed between both of the substrates 10 and the partition wall 20, as illustrated in FIG. 1.

(Other Components)

According to an embodiment of the optical device of the present disclosure, in addition to the substrate 10, the partition wall 20, the fluid 30, the fine uneven layer 40 and the conductive layer 50 described above, other components may be further provided corresponding to the performance required for the optical device.

For example, a hard coat layer, an anti-fogging layer, an adhesive layer, a light shielding layer, or the like may be provided on the surface 10a on the other side of the opposing face of the substrate 10.

<Method of Manufacturing an Optical Device>

Next, an embodiment of a method of manufacturing the optical device according to the present disclosure will be described.

As illustrated in FIG. 3, a method of manufacturing an optical device according to an embodiment of the present disclosure includes the steps of: forming the fine uneven layer 40 on each of the opposing faces of the two substrates 10 opposed to each other (Step 3A); forming the conductive layer 50 to cover the fine uneven layer 40 (Step 3B); forming, on the conductive layer 50, a partition wall structure 21 configured to separate adjacent spaces by imprint (Steps 3C and 3D); and filling the fluid 30 containing an electric field control material into a space 20b separated by the partition wall 20 (Steps 3E and 3F).

Through the above described steps, the optical device 1 that can improve the adhesion property between the substrate 10 and the partition wall 20 without causing a decrease in manufacturing efficiency and is excellent in the optical performance can be obtained.

The method of forming the fine uneven layer 40 on each of the opposing faces of the substrates 10 is not particularly limited, and a known film forming method can be appropriately used. However, from the viewpoint of further increasing the manufacturing efficiency, imprint is preferable.

Conditions of forming the fine uneven layer 40 by imprint are not particularly limited, and a known imprinting apparatus can be used. For example, when an ultraviolet curing resin is used as a material of the fine uneven layer 40, the fine uneven layer 40 can be formed by: using a cylindrical mold having a film unwinding and winding mechanism and a nip roll that is brought into contact with the mold and the pressure of which is adjustable; performing ultraviolet curing while pressing the ultraviolet curing resin against the cylindrical mold; and after that winding a film.

The method of forming the conductive layer 50 is not particularly limited as long as the conductive layer 50 can be formed to cover the fine uneven layer 40. For example, the conductive layer 50 can be formed by using sputtering, a coating method, a vapor deposition method or the like.

The partition wall structure 21 on the conductive layer 50 can be formed by imprint. The manufacturing efficiency of the optical device 1 can be enhanced by using the imprint. Further, partition wall structures 21 can be bonded to each other to form a partition wall 20 (Steps 3D and 3E).

The method of filling the fluid 30 into the spaces 20b separated by the partition wall 20 is not particularly limited, and the fluid 30 can be filled by a known method. For example, a hole may be provided in a portion of the partition wall 20 and after the fluid 20 is filled therethrough, the hole is closed.

The other conditions of the method of manufacturing the optical device according to an embodiment of the present disclosure are not particularly limited. For example, the conditions may be the same as those described with respect to the optical device according to the present disclosure.

<Electronic Device>

The electronic device according to the present disclosure has the optical device 1 according to the present disclosure described above.

The electronic device according to the present disclosure has the optical device 1 according to the present disclosure that is excellent in adhesion property between the substrate and the partition wall and the optical performance. In this manner, the durability of the optical device is improved and an excellent optical performance can be realized.

It is to be noted that the type of the electronic device is not particularly limited. Examples of the electronic device include, for example, electronic papers, display devices, variety of image display apparatuses, smart phones, computer apparatuses and the like.

EXAMPLES

Next, the present disclosure will be described in detail on the basis of examples. However, the present disclosure is not limited to the examples described below in any manner.

Examples 1 to 10 and Comparative Example 1

A sample of the optical device 1 as illustrated in FIG. 1 was produced. The optical device 1 includes the substrates 10 provided opposite to each other, the fine uneven layer 40 formed on each of opposing faces of the substrates 10, the conductive layers 50 formed to cover the fine uneven layers 40, the partition wall 20 formed between the opposing faces of the conductive layers, and the fluid 30 filled in the spaces separated by the partition wall 20 and containing an electric field control material.

Conditions of each member constituting the sample of the optical device 1 are as follows:

(1) Substrate

Two pieces of substrates made of polyethylene terephthalate were prepared.

(2) Fine Uneven Layer

The fine uneven layer was formed by an imprinting process using an acrylic ultraviolet curable resin as a material. The acrylic ultraviolet curing resin was produced from a resin composition having the following blending ratio. In the imprint, a mold in which an unevenness shape was applied by using photolithography was used to a cylindrical quartz base material having a diameter of 150 mm, and a sheet-like resin composition was formed into an uneven shape, and was irradiated with ultraviolet rays to be cured.
Monomers ("Alonics M305" from TOAGOSEI CO., LTD): 45% by mass
Oligomer ("UV-1700" from Nippon Synthetic Chemical Industry Co., Ltd.): 20% by mass
Reactive diluent ("DMAA" from KJ Chemicals Corporation): 30% by mass
Photopolymerization initiator ("Irgacure 184" from BASF Japan Co., Ltd.): 5% by mass The conditions of the average distance between unevennesses P and the average height of unevenness H of the produced fine uneven layer are illustrated in Table 1. In the sample of Comparative Example 1, the fine uneven layer was not provided.

(3) Conductive Layer

A conductive layer of indium tin oxide (5% tin) was formed by a sputtering process. The average thickness of the conductive layer is 60 nm and the sheet resistance is 150 Ω/sq.

(4) Partition Wall

The partition wall was formed by an imprinting process using an acrylic ultraviolet curable resin as a material. The acrylic ultraviolet curing resin was produced from the resin composition having the following blending ratio. In the imprint, a mold in which an unevenness shape was applied by a cutting process was used to a cylindrical metal base material having a diameter of 150 mm, and a sheet-like resin composition was formed into an uneven shape, and was irradiated with ultraviolet rays to be cured.
Monomers ("Alonics M305" from TOAGOSEI CO., LTD): 30% by Mass
Oligomer ("UV-1700" from Nippon Synthetic Chemical Industry Co., Ltd.): 30% by mass
Reactive diluent ("DMAA" from KJ Chemicals Corporation): 30% by mass
Photopolymerization initiator ("Irgacure 184" from BASF Japan Co., Ltd.): 5% by mass Further, the produced partition wall 20 extends in a direction connecting the substrates 10 as illustrated in FIG. 1, and the forming pitch, the thickness and the length of the extending portion 20a are 100 μm, 30 μm and 70 μm, respectively.

(5) Fluid

For the fluid, a solution in which an electric field control material (nanocarbon material) was dispersed in an organic solvent (cyclohexane) was used, and the solution was filled into each space separated by a partition wall by using a squeegee.

(Evaluation)

The following evaluations (1) to (5) were conducted with respect to each produced optical device sample and the evaluation results are shown in Table 1.

(1) Evaluation of Transferability of Fine Uneven Layer

In the production of each optical device sample, whether or not mold release was performed satisfactorily when the fine uneven layer was formed by imprint was evaluated according to the following criteria.
Good: Mold was satisfactory released.
Fair: Poor mold release occurred with a part of the fine uneven layer.
Bad: Poor mold release occurred and it was difficult to form a fine uneven layer.

(2) Evaluation of Adhesion

Obtained each optical device sample was subjected to a pencil scratch test in accordance with JIS K 5400 (1990) and the presence of peeling between the substrate and the partition wall after the test was confirmed. The proportion (%) of mass not peeled was calculated and the samples were evaluated according to the following criteria.
Good: 90% or more
Fair: 10% or more to less than 90%
Bad: Less than 1%

(3) Evaluation of Transmittance

The luminous transmittance (%) of obtained each optical device sample was measured by using a measuring apparatus (V-570 from JASCO Corporation) and the samples were evaluated according to the following criteria.
Good: 70% or more
Fair: 60% or more to less than 70%
Bad: Less than 60%

FIG. 5 is a graph showing the values of luminous transmittance (%) with respect to the wavelength of obtained each optical device sample.

(4) Evaluation of Diffraction Light

Obtained each optical device sample was irradiated with white light obliquely (at an angle of about 30° with respect to the surface of the optical device) in a dark room, and the presence of diffracted light was visually confirmed and each sample was evaluated according to the following criteria.
Good: Almost no diffracted light was visually confirmed.
Fair: Although diffracted light was visually confirmed, no strong diffracted light was visually confirmed.
Bad: Strong diffracted light was visually confirmed.

(5) Comprehensive Evaluation

On the basis of the results of the evaluations (1) to (4) described above, a comprehensive evaluation was performed according to the following criteria.
Good: All of evaluations (1) to (4) were Good.
Fair: Some of evaluations (1) to (4) were Fair and none of evaluations (1) to (4) were Bad.
Bad: Some of evaluations (1) to (4) were Bad.

TABLE 1

|  |  | Example 1 | Example 2 | Example 3 | Example 4 | Example 5 | Example 6 | Comparative Example 1 | Example 7 | Example 8 | Example 9 | Example 10 |
|---|---|---|---|---|---|---|---|---|---|---|---|---|
| Conditions of fine uneven layer | Average distance between unevennesses | 250 nm | 250 nm | 250 nm | 250 nm | 280 nm | 50 nm | — | 250 nm | 310 nm | 40 nm | 250 nm |
|  | Average height of unevenness | 180 nm | 90 nm | 40 nm | 30 nm | 60 nm | 180 nm | — | 20 nm | 180 nm | 180 nm | 50 nm |
| Evaluation | Transferability | Good | Good | Good | Good | Good | Good | — | Good | Good | Fair | Good |
|  | Adhesion | Good (100%) | Good (100%) | Good (100%) | Good (92%) | Good (100%) | Good (100%) | Bad (0%) | Fair (14%) | Good (100%) | Good (100%) | Good (89%) |
|  | Transmittance (@550 nm) | Good (90.7%) | Good (92.1%) | Good (80.0%) | Good (70.6%) | Good (92.9%) | Good (93.7%) | Bad (52.3%) | Fair (62.3%) | Good (88.1%) | Good (70.4%) | Good (88.0%) |
|  | Diffraction light (visual confirmration) | Good | Good | Good | Good | Fair | Good | Good | Good | Fair | Good | Good |
|  | Comprehensive evaluation | Good | Good | Good | Good | Fair | Good | Bad | Fair | Fair | Fair | Fair |

Figure 4:
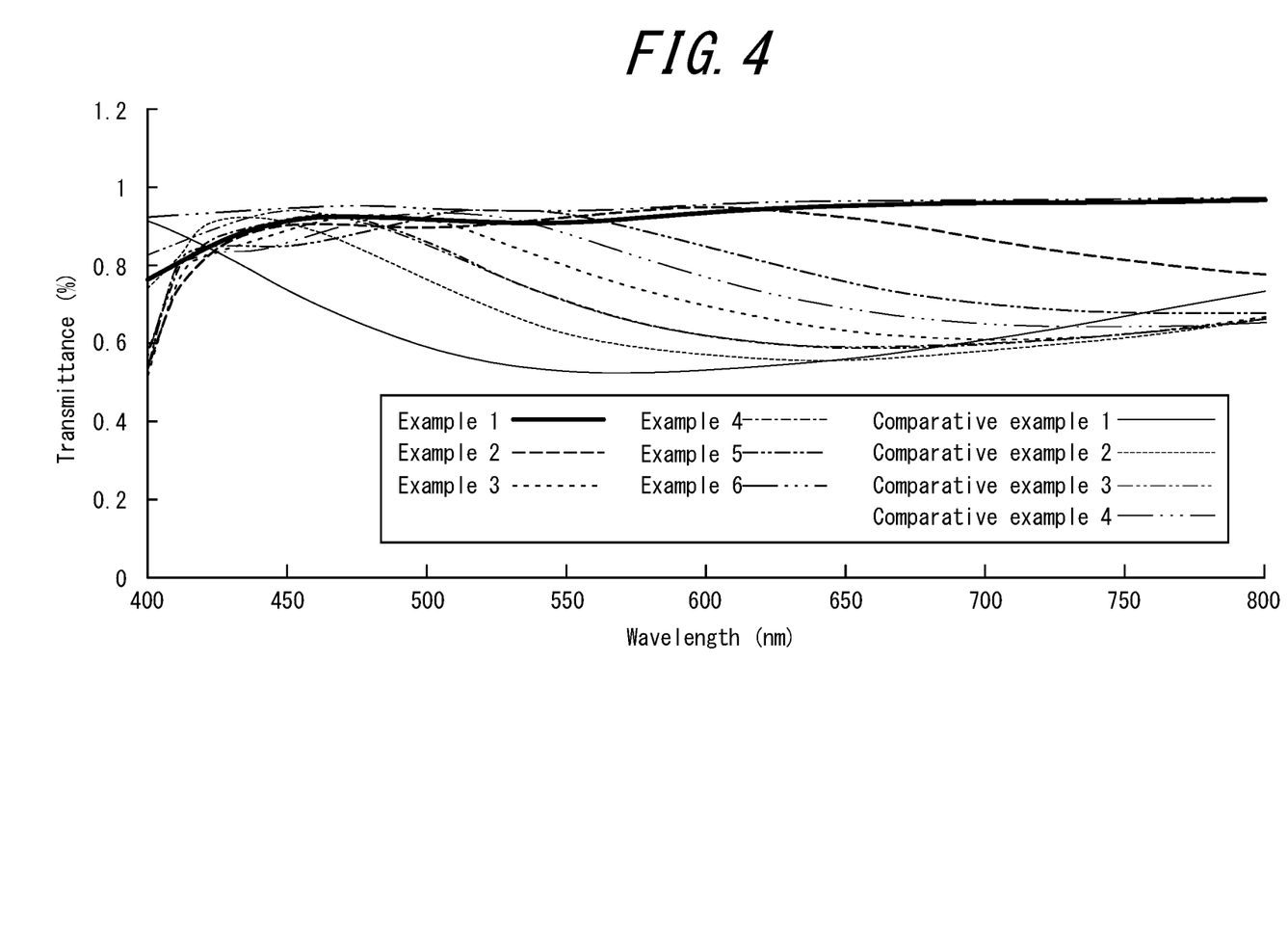
FIG. 4 is a graph illustrating the transmittance (%) according to the wavelength of an optical device of each Example and each Comparative Example.

From the results of Table 1 and FIG. 4, no bad results were confirmed with each optical device sample of Examples (comprehensive evaluation was Fair or Good). In particular, among optical device samples of the Examples, the samples to which the distance and the height of unevenness of the fine uneven layer were optimized showed good results with respect to all evaluation items.

On the other hand, it was found that the optical device sample of the Comparative Example to which the fine uneven layer was not provided showed poor results in terms of light transmittance and adhesion property between the substrate and the partition wall.

INDUSTRIAL APPLICABILITY

According to the present disclosure, an optical device that can improve adherence between a substrate and a partition wall without causing a decrease in manufacturing efficiency and is excellent in optical performance and a method of manufacturing the optical device can be provided. Further, according to the present disclosure, an electronic device having an optical device that is excellent in durability and optical performance can be provided.

REFERENCE SIGNS LIST

1 Optical device
10 Substrate
10a Surface on the other side of opposing face
20 Partition wall
20a Portion extending in a direction connecting two substrates
20b Space separated by a partition wall
21 Partition wall structure
30 Fluid
40 Fine uneven layer
50 Conductive layer

The invention claimed is:

1. An optical device comprising: two substrates provided opposite to each other; a partition wall formed between opposing faces of the two substrates and configured to separate adjacent spaces; and a fluid filled in the spaces separated by the partition wall and containing an electric field control material, wherein
the optical device further comprises, between one of the two substrates and the partition wall, and between the other of the two substrates and the partition wall, respective fine uneven layers having fine uneven shapes and respective conductive layers formed according to shapes of the respective fine uneven layers;
an average distance between unevennesses of the fine uneven layers is 50 to 300 nm and an average height of unevenness of the fine uneven layers is 30 nm or more;
the fine uneven layers are formed on the opposing faces of the two substrates;
the conductive layers cover the fine uneven layers; and
the partition wall is formed between opposing faces of the conductive layers.

2. The optical device according to claim 1, wherein the uneven shapes of the fine uneven layer are formed by imprint.

3. An electronic device comprising an optical device according to claim 1.

4. A method of manufacturing the optical device of claim 1, comprising the steps of:
providing two substrates opposite to each other;
forming fine uneven layers having fine uneven shapes on opposing faces of the two substrates;
forming conductive layers to cover the fine uneven layers;
forming, by imprint, a partition wall structure configured to separate adjacent spaces, between opposing faces of the conductive layers; and
filling a fluid containing an electric field control material into the spaces separated by the partition wall, wherein
an average distance between unevennesses of the fine uneven layers is 50 to 300 nm and an average height of unevenness of the fine uneven layers is 30 nm or more.

* * * * *